United States Patent
Ehrne

(10) Patent No.: US 10,302,225 B2
(45) Date of Patent: May 28, 2019

(54) VACUUM VALVE

(71) Applicant: VAT Holding AG, Haag (CH)

(72) Inventor: Florian Ehrne, Frumsen (CH)

(73) Assignee: VAT Holding AG, Haag (CH)

( * ) Notice: Subject to any disclaimer, the term of this patent is extended or adjusted under 35 U.S.C. 154(b) by 81 days.

(21) Appl. No.: 15/556,863

(22) PCT Filed: Feb. 19, 2016

(86) PCT No.: PCT/EP2016/053526
§ 371 (c)(1),
(2) Date: Sep. 8, 2017

(87) PCT Pub. No.: WO2016/142150
PCT Pub. Date: Sep. 15, 2016

(65) Prior Publication Data
US 2018/0274695 A1    Sep. 27, 2018

(30) Foreign Application Priority Data
Mar. 9, 2015  (AT) ..................................... 125/2015

(51) Int. Cl.
*F16K 51/02* (2006.01)
*F16K 3/18* (2006.01)
*F16K 31/122* (2006.01)

(52) U.S. Cl.
CPC ............. *F16K 51/02* (2013.01); *F16K 3/18* (2013.01); *F16K 3/188* (2013.01); *F16K 31/1225* (2013.01)

(58) Field of Classification Search
CPC ...... F16K 51/02; F16K 31/1225; F16K 3/188; F16K 3/18

USPC ................................................... 251/56, 193
See application file for complete search history.

(56) References Cited

U.S. PATENT DOCUMENTS

| | | | |
|---|---|---|---|
| 5,641,149 A | 6/1997 | Ito | |
| 5,934,646 A | 8/1999 | Tamura et al. | |
| 6,045,117 A | 4/2000 | Tamura et al. | |
| 6,056,266 A | 5/2000 | Blecha | |

(Continued)

FOREIGN PATENT DOCUMENTS

| | | |
|---|---|---|
| CN | 102171499 | 8/2011 |
| DE | 102012021354 | 5/2013 |

(Continued)

*Primary Examiner* — John Bastianelli
(74) *Attorney, Agent, or Firm* — Volpe and Koenig, P.C.

(57) ABSTRACT

A vacuum valve having a valve body with a valve opening surrounded by a valve seat, a closure member displaceable parallel to a longitudinal adjustment direction between an open position, and an intermediate position, in which the closure member covers the valve opening but is raised from valve seat, and a closed position, a valve rod supporting the closure member, a longitudinal stroke linear guide which has a longitudinal stroke slider connected to the valve rod and a longitudinal stroke guide part by which the longitudinal stroke slider is guided in a linearly displaceable manner in the longitudinal adjustment direction, and a transverse stroke linear guide which includes a transverse stroke slider connected to the longitudinal stroke guide part and a transverse stroke guide part by which the transverse stroke slider is guided in a linearly displaceable in an oblique adjustment direction positioned oblique to the longitudinal adjustment direction.

15 Claims, 6 Drawing Sheets

(56) References Cited

U.S. PATENT DOCUMENTS

| | | |
|---|---|---|
| 6,082,706 A | 7/2000 | Irie |
| 6,095,741 A | 8/2000 | Kroeker et al. |
| 6,237,892 B1 | 5/2001 | Ito |
| 6,390,448 B1 | 5/2002 | Kroeker et al. |
| 6,619,618 B2 | 9/2003 | Ishigaki et al. |
| 6,899,316 B2 | 5/2005 | Duelli |
| 6,913,243 B1 | 7/2005 | Tomasch |
| 7,066,443 B2 | 6/2006 | Ishigaki |
| 7,128,305 B2 * | 10/2006 | Tomasch ............... F16K 3/18 251/211 |
| 7,500,649 B2 | 3/2009 | Litscher et al. |
| 7,611,122 B2 | 11/2009 | Tichy |
| 7,762,527 B2 | 7/2010 | Schoen et al. |
| 7,980,529 B2 | 7/2011 | Seitz |
| 8,177,190 B2 | 5/2012 | Maerk |
| 8,505,875 B2 | 8/2013 | Mahr et al. |
| 8,672,293 B2 | 3/2014 | Ehrne et al. |
| 8,727,311 B2 | 5/2014 | Ehrne |
| 8,800,956 B2 | 8/2014 | Ishigaki et al. |
| 8,960,641 B2 * | 2/2015 | Blecha ............... F16K 3/18 251/158 |
| 2005/0092953 A1 | 5/2005 | Hayashi et al. |
| 2007/0272888 A1 | 11/2007 | Tichy |
| 2008/0017823 A1 | 1/2008 | Litscher |
| 2009/0272324 A1 | 11/2009 | Balasubramanyam et al. |
| 2010/0219362 A1 | 9/2010 | Duelli |
| 2011/0095218 A1 | 4/2011 | Schoch et al. |
| 2012/0258242 A1 | 10/2012 | Tsunoda et al. |
| 2012/0298899 A1 | 11/2012 | Geiser et al. |
| 2013/0112906 A1 | 5/2013 | Ishigaki et al. |
| 2014/0131603 A1 | 5/2014 | Blecha |
| 2014/0183391 A1 | 7/2014 | Blecha |
| 2015/0014556 A1 | 1/2015 | Ishigaki et al. |
| 2015/0075659 A1 * | 3/2015 | Rice ............... F16K 51/02 137/861 |
| 2016/0305555 A1 | 10/2016 | Jee |
| 2017/0204647 A1 | 7/2017 | Ehrne |
| 2018/0051825 A1 | 2/2018 | Ehrne et al. |

FOREIGN PATENT DOCUMENTS

| | | |
|---|---|---|
| DE | 102014109673 | 1/2014 |
| EP | 1061301 | 12/2000 |
| EP | 2605271 | 6/2013 |
| EP | 2749798 | 7/2014 |
| JP | 9303578 | 11/1997 |
| JP | H112360 | 1/1999 |
| JP | H11351419 | 12/1999 |
| JP | 2000257751 | 9/2000 |
| JP | 2009191924 | 8/2009 |
| JP | 2013087814 | 5/2013 |
| KR | 20090112134 | 10/2009 |
| KR | 1020110118243 | 10/2009 |
| KR | 1020130113624 | 10/2013 |
| WO | 2009070824 | 6/2009 |
| WO | 2010034046 | 4/2010 |
| WO | 2014075757 | 5/2014 |
| WO | 2017022968 | 2/2017 |

* cited by examiner

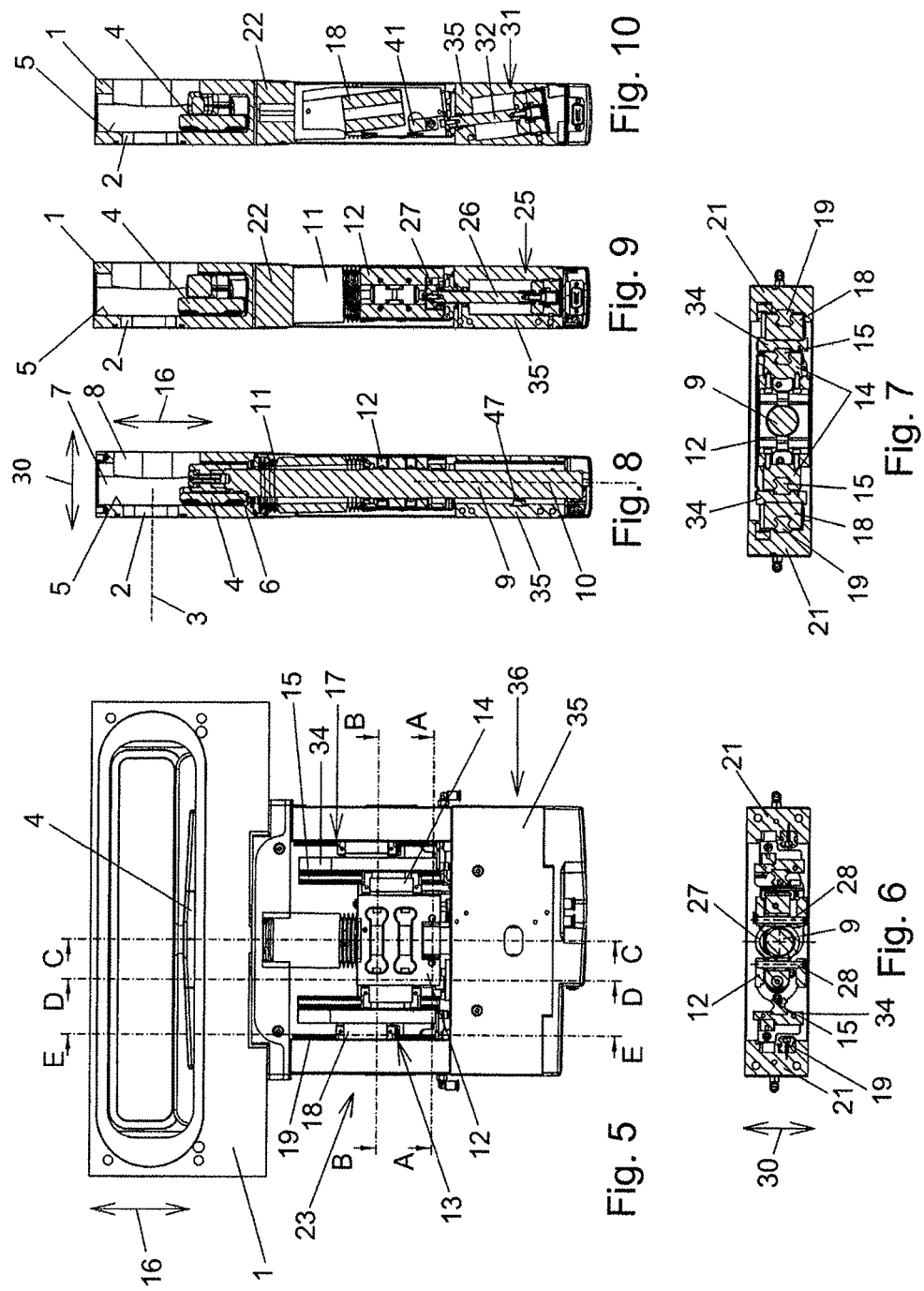

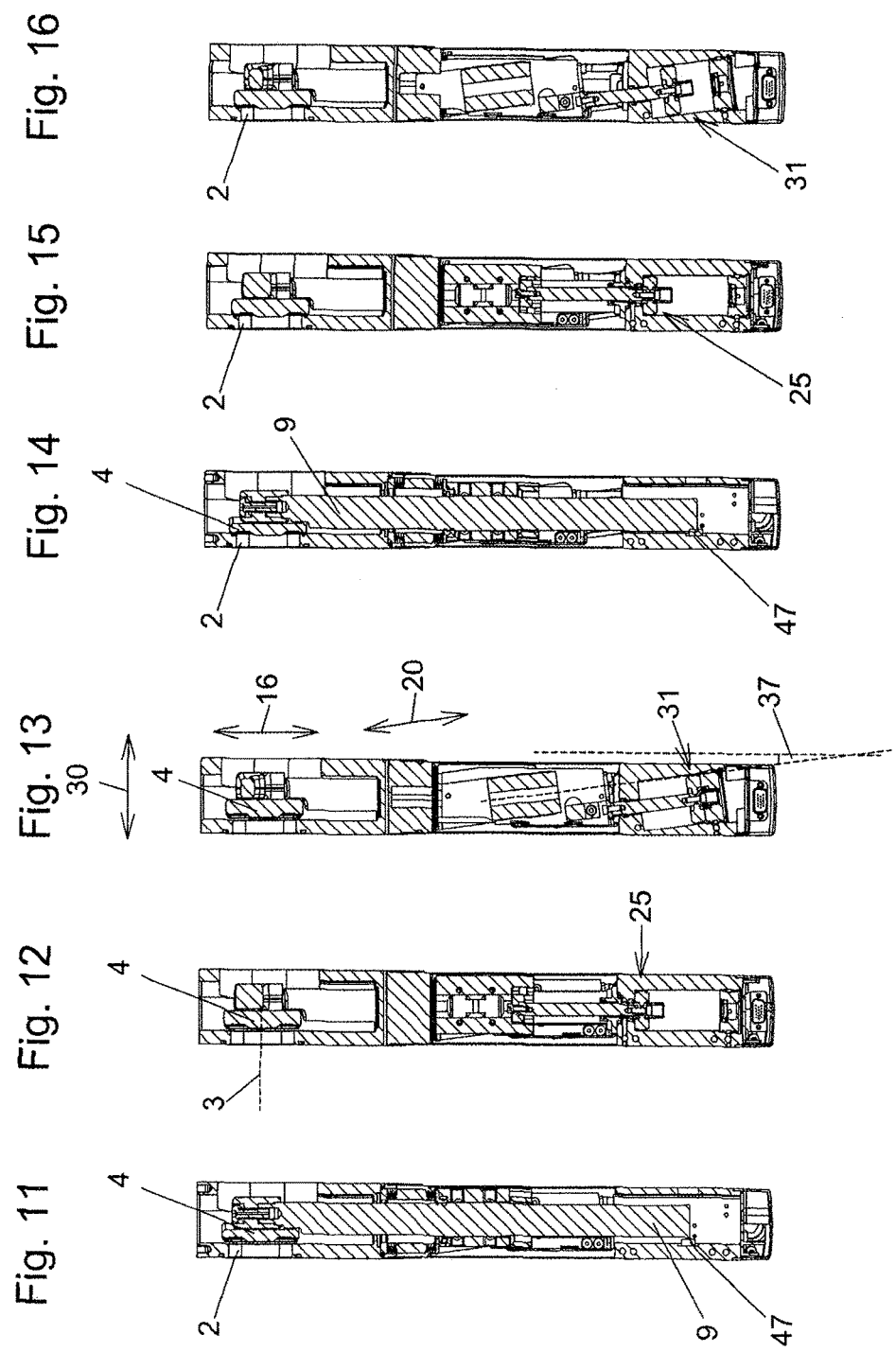

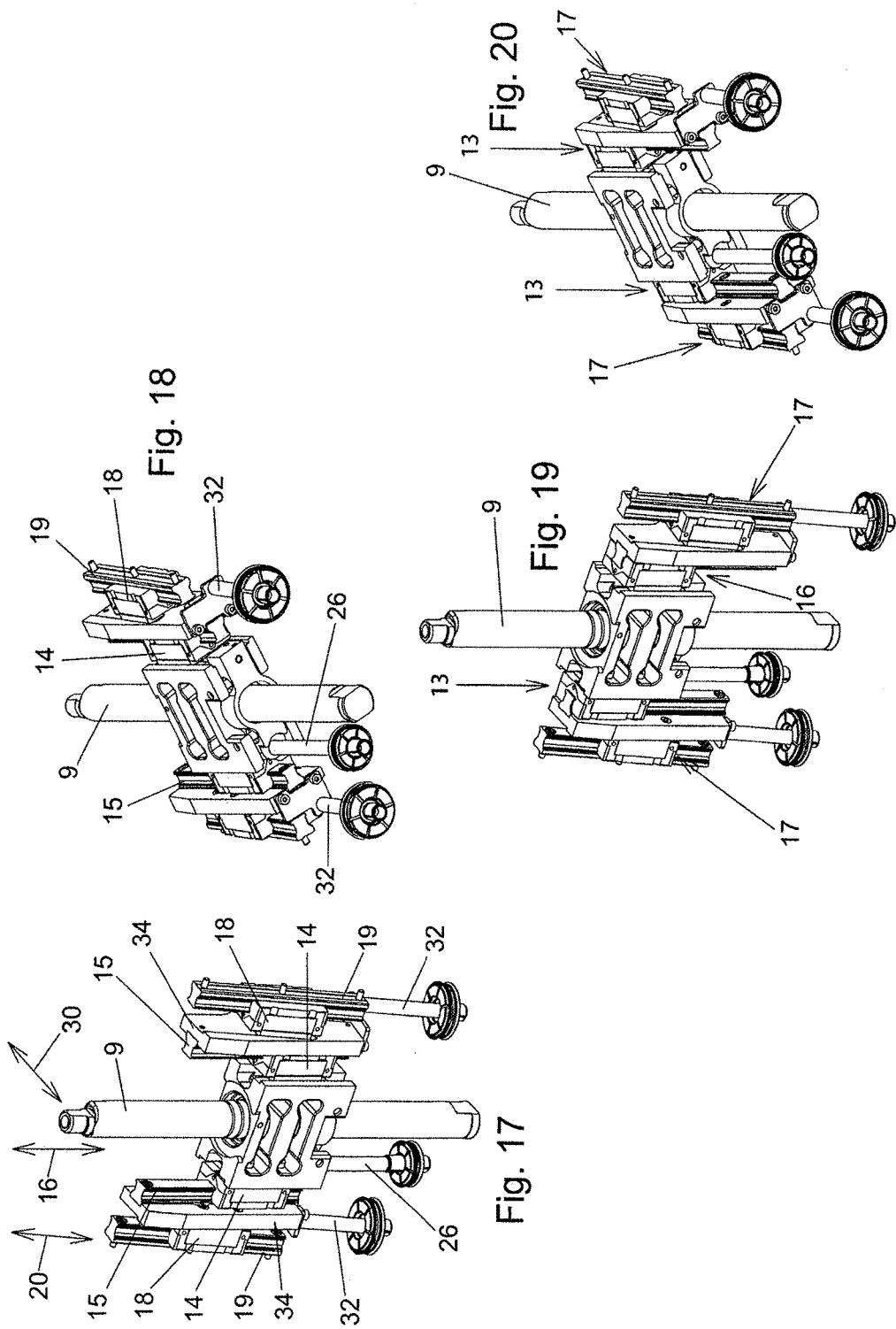

VACUUM VALVE

BACKGROUND

The invention relates to a vacuum valve, comprising a valve body with a valve opening which has an axis and is surrounded by a valve seat, a closure member which is adjustable parallel to a longitudinal adjustment direction between an open position, in which said closure member opens up the valve opening, and an intermediate position, in which said closure member covers the valve opening but is raised from the valve seat, and which is adjustable parallel to a transverse adjustment direction between the intermediate position and a closed position, in which said closure member lies against the valve seat, a valve rod which supports the closure member, a longitudinal stroke linear guide which has a longitudinal stroke slide, which is connected to the valve rod, and a longitudinal stroke guide part, by which the longitudinal stroke slide is guided in a linearly displaceable manner in the longitudinal adjustment direction, a longitudinal stroke drive, by which the longitudinal stroke slide is displaceable in relation to the longitudinal stroke guide part in order to adjust the closure member between the open position and the intermediate position, and a transverse stroke drive for adjusting the closure member between the intermediate position and the closed position.

Vacuum valves, in which, in order to close the vacuum valve, the closure member is first of all displaced in a longitudinal adjustment direction, which lies parallel to the valve rod, from an open position into an intermediate position, in which the closure member covers the valve opening, but is still raised from the valve seat, and, as a result, is placed against the valve seat in a transverse adjustment direction lying at an angle to the longitudinal adjustment direction, are also referred to as L valves.

In the case of a non-generic design of L valves, the valve rod is mounted pivotably about an axis, which is at right angles to the longitudinal adjustment direction, in order to permit the adjustment of the valve plate from its intermediate position into its closed position and back. In order to pivot the valve rod about the axis, use can be made here of slotted guides, as is known, for example, from U.S. Pat. No. 6,237,892 B1, U.S. Pat. No. 7,066,443 B2 or US 2012/0258242 A1.

In the case of L valves, in which, in order to adjust the closure member between the intermediate position and the closed position, a parallel displacement of the closure member takes place in a transverse adjustment direction at an angle, in particular at right angles, to the longitudinal adjustment direction, according to a conventional embodiment drive elements for adjusting the closure member between the intermediate position and the closed position are arranged on a supporting unit supporting the closure member, wherein the supporting unit is located within the valve housing of the vacuum valve and is attached to a valve rod which is led out of the vacuum region of the vacuum valve. Such embodiments of L valves are disclosed, for example, in U.S. Pat. Nos. 6,056,266 A, 6,899,316 B2 and 7,611,122 B2. In this connection, U.S. Pat. Nos. 6,056,266 A and 7,611,122 B2 also disclose sequence controls in order to ensure the correct sequence of actuation of the piston-cylinder units. A further such sequence control for an L valve is revealed in U.S. Pat. No. 8,177,190 B2.

An L valve, in which a linear displacement of the closure member between the intermediate position and the closed position takes place, wherein both the drive for the adjustment of the closure member between the open position and the intermediate position and the drive for the adjustment of the closure member between the intermediate position and the closed position are arranged outside the vacuum is revealed in WO 2010/034046 A1. A block which displaceably supports the valve rod in the longitudinal adjustment direction and to which the drive for the adjustment of the valve rod in the longitudinal adjustment direction is also attached is displaceable here linearly in a transverse adjustment direction lying at right angles to the longitudinal adjustment direction, wherein this linear displacement takes place by piston-cylinder units acting in this direction.

U.S. Pat. No. 7,762,527 B2 also presents an embodiment of an L valve, in which the drives for the linear adjustment of the closure member in the longitudinal adjustment direction and in the transverse adjustment direction are arranged outside the vacuum. One possible embodiment makes provision here for the piston-cylinder unit for adjustment of the closure member in the longitudinal adjustment direction to be mounted displaceably in relation to a valve housing in the transverse adjustment direction, which lies at right angles to the longitudinal adjustment direction, by a linear guide.

A vacuum valve of the type mentioned at the beginning is disclosed in WO 2014/075757 A1. A longitudinal stroke linear guide, by which the valve rod is guided displaceably in the longitudinal adjustment direction, is formed here by a transmission piece, which is connected to the valve rod, in a manner corresponding to a longitudinal stroke slide which is guided displaceably along rod-shaped guide parts. The rod-shaped guide parts are displaceable in a transverse adjustment direction lying at right angles to the longitudinal adjustment direction and can be displaced in the transverse adjustment direction by a transverse stroke drive formed by pneumatic piston-cylinder units. For the displacement of the valve rod in the longitudinal adjustment direction, use is also made of pneumatic piston-cylinder units, the valve rods of which are connected to the transmission piece, wherein this connection permits movability of the transmission piece in relation to the valve rods in the transverse adjustment direction. A disadvantage of the device disclosed in this document is the relatively complicated design of the unit having the drive elements and guide elements, which leads to the vacuum valve being more expensive. It would also be difficult in the case of this vacuum valve to use different types of drives according to choice.

SUMMARY

It is the object of the invention to provide an improved vacuum valve of the type mentioned at the beginning. This is achieved by a vacuum valve with one or more features of the invention.

A vacuum valve according to the invention comprises a longitudinal stroke linear guide with a longitudinal stroke slide which is guided in a linearly displaceable manner along a longitudinal stroke guide part parallel to a longitudinal adjustment direction and is connected to the valve rod, and a transverse stroke linear guide with a transverse stroke slide which is guided in a linearly displaceable manner along a transverse stroke guide part parallel to an oblique adjustment direction, wherein the transverse stroke slide is connected to the longitudinal stroke guide part of the longitudinal stroke linear guide. In order to adjust the closure member between the intermediate position and the closed position, the transverse stroke slide is displaced along the transverse stroke guide part by the transverse stroke drive. By the connection of the transverse stroke slide to the longitudinal stroke guide part, displacement of the longitudinal stroke guide part parallel to the oblique adjustment direction also takes place here while the longitudinal stroke slide maintains its position with respect to the longitudinal stroke adjustment direction. A movement of the longitudinal stroke slide parallel to the transverse adjustment direction therefore occurs and therefore so does the adjustment of the closure member parallel to the transverse adjustment direction.

By the use of linear guides lying obliquely with respect to one another, in order to carry out the movement of the closure member in the longitudinal adjustment direction and transverse adjustment direction, a cost-effective embodiment is made possible. Use can advantageously be made of standard parts for the linear guides, as are used in large numbers in mechanical engineering and which are commercially obtainable cost-effectively. The parts for fastening said linear guides can be formed relatively simply and cost-effectively.

Furthermore, by use of the embodiment according to the invention, a spatial separation, with respect to the longitudinal adjustment direction, between a guide unit, which has the guide parts for guiding the movement of the closure member in the longitudinal adjustment direction and transverse adjustment direction, and a drive unit which comprises the longitudinal stroke drive and the transverse stroke drive is made possible. This permits a modular construction, in the form that the same guide unit or an at least substantially identically designed guide unit can be used in conjunction with different types of drive units. For example, one possible type of drive unit can have pneumatic piston-cylinder units as drive elements, and another type of drive unit can have electrically operated drive elements.

The angle between the longitudinal adjustment direction and the oblique adjustment direction is advantageously less than 45°, wherein an angle which is smaller by comparison thereto is advantageous in order to make not too large a constructional width (with respect to the transverse adjustment direction) of the vacuum valve possible. The angle between the longitudinal adjustment direction and the oblique adjustment direction is advantageously more than 4°, wherein an angle which is larger by comparison thereto is advantageous in order to make not too large a constructional length (with respect to the longitudinal adjustment direction) of the vacuum valve possible. The angle between the oblique adjustment direction and the longitudinal adjustment direction advantageously lies within the range of 5° to 20°, wherein a range of 6° to 12° is particularly preferred. This achieves a step-up for the force exerted on the closure member by the transverse stroke drive in the transverse adjustment direction. The required contact pressure force of the closure member against the valve seat in the closed state of the vacuum valve can thereby be achieved by a relatively small driving force of the transverse stroke drive. Force control or possibly travel control of the transverse stroke drive for the contact pressure force of the closure member against the valve seat in the closed position is also facilitated by the travel of the transverse stroke slide, the travel being relatively great because of the step-up.

In an advantageous embodiment of the invention, the connection of the longitudinal stroke slide to the longitudinal stroke drive has movability parallel to the transverse adjustment direction. The longitudinal stroke drive can therefore be mounted immovably with respect to the transverse adjustment direction. However, an embodiment, in which, during the movement of the closure member and of the valve rod parallel to the transverse adjustment direction, the longitudinal stroke drive moves together therewith, would also be conceivable and possible.

In an expedient embodiment, a respective longitudinal stroke slide is attached on both sides to a connecting part which is connected to the valve rod. "On both sides" refers here to a direction lying at right angles to the longitudinal adjustment direction and at right angles to the transverse adjustment direction. A respective longitudinal stroke slide is guided displaceably here parallel to the longitudinal adjustment direction by a respective longitudinal stroke guide part, and the two longitudinal stroke guide parts are each connected to a transverse stroke slide which is guided displaceably parallel to the oblique adjustment direction by a respective transverse stroke guide part. There are therefore two longitudinal stroke linear guides and two transverse stroke linear guides.

It is advantageous if the oblique adjustment direction lies in the plane spanned by the longitudinal adjustment direction and transverse adjustment direction. Furthermore, it is preferred that the transverse adjustment direction lies at right angles to the longitudinal adjustment direction, wherein the valve seat lies in a plane, with respect to which the transverse adjustment direction is oriented at right angles. As a result, the closure member can be placed at right angles onto the valve seat. Deviations from such a right angled positioning that are preferably less than 20° are however tolerable.

Within the context of a simple embodiment, the axis of the valve opening preferably lies at right angles to the plane in which the valve seat lies.

The valve rod advantageously has a longitudinal axis lying parallel to the longitudinal adjustment direction.

An expedient development of the invention provides a locking device for securing a state of the vacuum valve in the event of failure of an operating means of the longitudinal stroke drive and transverse stroke drive. In this case, during normal operation (i.e. the operating means of the longitudinal stroke drive and of the transverse stroke drive is available), a first locking member of the locking device is spaced apart from a second locking member counter to the force of a spring, specifically by an actuator, which is operated by the operating means, of the locking device. If the operating means fails, the first locking member is pressed by the spring against the second locking member and thereby blocks an adjustment of the closure member. The closure member can thereby be held securely in the closed position and/or open position even if the operating means fails.

BRIEF DESCRIPTION OF THE DRAWINGS

Further advantages and details of the invention are explained below with reference to the attached drawing, in which:

FIG. 5 shows a view in the open position of the closure member;

FIG. 6 shows a section along the line AA of FIG. 5;

FIG. 7 shows a section along the line BB of FIG. 5;

FIG. 8 shows a section along the line CC of FIG. 5;

FIG. 9 shows a section along the line DD of FIG. 5;

FIG. 10 shows a section along the line EE of FIG. 5;

FIGS. 11, 12 and 13 show sections analogously to FIGS. 8, 9 and 10, but in the intermediate position of the closure member;

FIGS. 14, 15 and 16 show sections analogously to FIGS. 8, 9 and 10, but in the closed position of the closure member;

FIGS. 17 and 18 show perspective views of the valve rod, the linear guides and of parts of the longitudinal stroke and transverse stroke drive in the position in which the open position of the closure member is present;

FIGS. 19 and 20 show perspective views analogously to FIGS. 17 and 18, but in the position in which the intermediate position of the closure member is present;

DETAILED DESCRIPTION OF THE PREFERRED EMBODIMENTS

Figure 1:
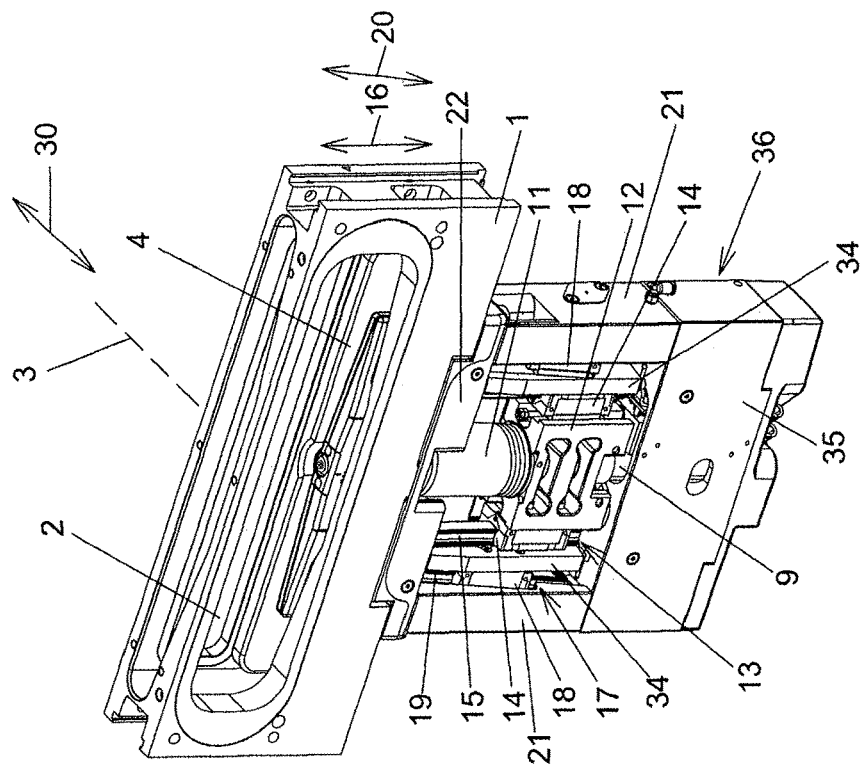
FIG. 1 shows a perspective view of a vacuum valve according to an exemplary embodiment of the invention.
Figure 2:
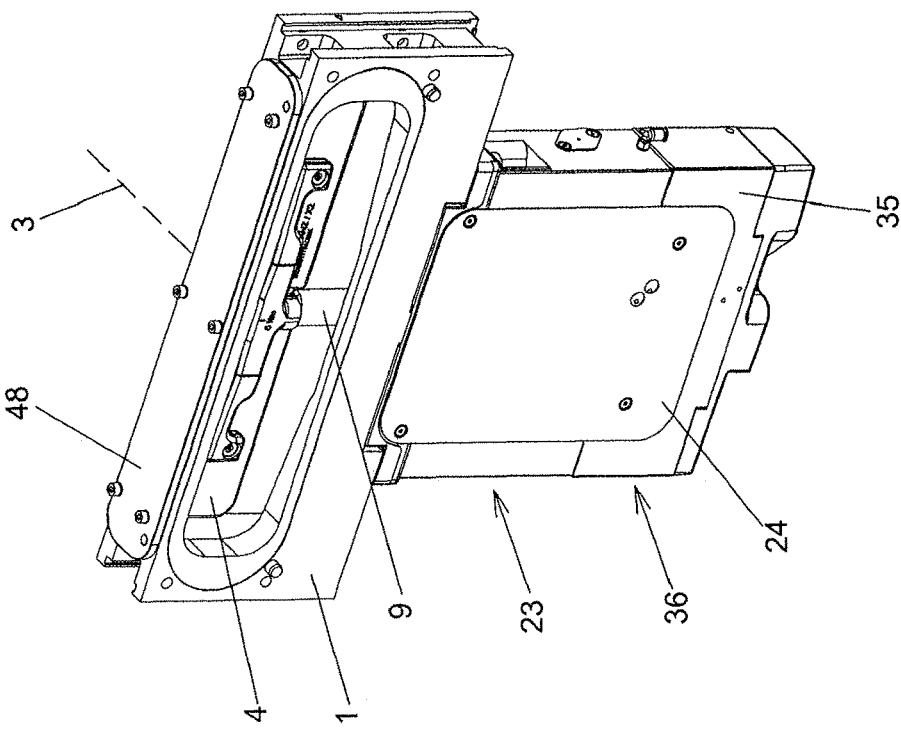
FIG. 2 shows a perspective view corresponding to FIG. 1, but covering plates and a cover part of the valve body are omitted, in the open position of the closure member.

An exemplary embodiment of a vacuum valve according to the invention is illustrated in the Figures.

The vacuum valve has a valve body 1 which has a wall which has a valve opening 2 with an axis 3. In the closed state of the vacuum valve, the valve opening 2 is closed by a closure member 4 which is in particular of plate-like design and which then takes up its closed position. In the closed position of the closure member 4, the latter is pressed against a valve seat 5 which surrounds the valve opening 2 on the side facing the closure member 4. In the open state of the vacuum valve, the closure member 4 opens up the valve opening 2 and the closure member 4 then takes up its open position. The adjustment of the closure member 4 between the closed position and the open position takes place via an intermediate position, in which the closure member covers the valve opening 2, as seen in the direction of the axis 3 of the valve opening 2, but is raised (=spaced apart) from the valve seat 5.

For sealing between the closure member 4 and the wall, which has the valve opening 2, of the valve body 1 in the closed position of the closure member 4, use is made of an elastic sealing ring 6 (for example composed of FPM or FFPM) arranged on the closure member 4, and the valve seat 5 has a sealing surface against which the sealing ring 6 is pressed. In principle, the sealing ring 6 could also be arranged on the sealing seat and pressed against a sealing surface of the closure member 4.

In the exemplary embodiment, the valve body 1 is designed in the manner of a housing and can therefore also be referred to as the valve housing, and the closure member 4 is arranged in an interior space 7 of the valve body 1. Said interior space 7 of the valve body 1 forms a vacuum region of the vacuum valve (=a region in which there can be a vacuum). In a further wall, the valve body 1 has a further opening 8, and therefore a passage channel is formed through the valve body 1. In the exemplary embodiment, this passage channel runs rectilinearly in the direction of the axis 3.

In the exemplary embodiment, the valve body 1 has another opening which is closed by a cover part 48 (which is only illustrated in FIG. 1) and by which maintenance is simplified. However, said opening and the cover part 48 could also be omitted.

The valve body 1 can be connected to other parts of a vacuum system, for example vacuum chambers and/or pipes. In the open position of the closure member 4, the interior space 7 of the valve body 1 is then connected to the interior space of a first part of the vacuum system via the valve opening 2, and the interior space 7 is connected to the interior space of a further part of the vacuum system via the opening 8.

The vacuum valve could basically also be designed as what is referred to as an insert, wherein, in the operating state of the vacuum valve, the valve body 1 would be arranged in the interior space of a vacuum chamber on a wall of the vacuum chamber and in a sealed manner with respect thereto, and therefore the valve opening 2 is aligned with an opening in the wall of the vacuum chamber. The opposite wall of the vacuum valve with the opening 8 could then be omitted. The closure member 4 is then also arranged in a vacuum region of the vacuum valve.

The closure member 4 is supported by a valve rod 9, in the exemplary embodiment via a connecting piece (not denoted in the Figures) fastened at one end to the valve rod and at the other end to the closure member. The valve rod is led out of the vacuum region of the vacuum valve through an opening in the valve body 1, wherein said valve rod is movable in the direction of its longitudinal axis 10 and also in a direction at right angles thereto. For this purpose, an expansion bellows 11 is used in the exemplary embodiment. A different type of vacuum lead-through can basically also be provided for this purpose, for example a different type of bellows or a linear lead-through which is itself mounted displaceably in a sealed manner in relation to the valve body in a direction at right angles to the direction of the lead-through.

A connecting part 12 is fastened rigidly to the valve rod 9 outside the vacuum region. A respective longitudinal stroke slide 14 of a respective longitudinal stroke linear guide 13 is fastened rigidly on opposite sides to said connecting part. A respective longitudinal stroke slide 14 is guided in a linearly displaceable manner by a longitudinal stroke guide part 15 of the respective longitudinal stroke linear guide 13, specifically parallel to a longitudinal adjustment direction 16. The longitudinal adjustment direction 16 lies parallel to the longitudinal axis 10 of the valve rod 9.

A transverse stroke slide 18 of a respective transverse stroke linear guide 17 is rigidly connected to the longitudinal stroke guide part 15 of a respective longitudinal stroke linear guide 13. In the exemplary embodiment, the connection takes place in each case via a holding piece 34 to which the longitudinal stroke guide part 15 is fastened at one end and the transverse stroke slide 18 at the other end. However, separate holding pieces 34 could also be omitted.

The transverse stroke slides 18 are each guided in a linearly displaceable manner by a transverse stroke guide part 19, specifically parallel to an oblique adjustment direction 20. The oblique adjustment direction 20 lies obliquely with respect to the longitudinal adjustment direction 16.

The transverse stroke guide parts 19 are rigidly connected to the valve body 1. In the exemplary embodiment, the transverse stroke guide parts 19 are each secured to a strut 21, wherein the struts 21 are secured to a support part 22 which, for its part, is fastened to the valve body 1, preferably, as is apparent from FIG. 23, by screw connections. The rigid connection of the transverse stroke guide parts 19 to the valve body 1 could also take place in another manner.

The longitudinal stroke linear guides 13 and transverse stroke linear guides 17 together with their connecting and holding parts (which, in the exemplary embodiment, comprise the holding pieces 34, the struts 21 and the support part 22) are parts of a guide unit 23 which is rigidly connected to the valve body 1.

In the exemplary embodiment shown, the longitudinal stroke and transverse stroke guide parts 15, 19 are designed as guide rails. The longitudinal stroke linear guides and transverse stroke linear guides 13, 17 are therefore rail guides. An embodiment in the form of shaft guides, in which the longitudinal stroke and transverse stroke guide parts 15, 19 are formed by cross-sectionally round rods, is also conceivable and possible. For example, a longitudinal stroke and/or transverse stroke linear guide could also be formed by at least one guide track in which at least one guide extension (pin or roller) engages, that is to say in the manner of a slotted guide. The guide track can be formed, for example, by an elongated hole, a groove or a bead.

The longitudinal stroke linear guides 13 and transverse stroke linear guides 17 are advantageously designed as roller guides. An embodiment in the form of sliding guides could also be provided.

The closure member can be adjusted from the open position via the intermediate position into the closed position and back by the longitudinal stroke linear guides 13 and the transverse stroke linear guides 17, as is explained in more detail further below. The adjustment between the open position and the intermediate position takes place here parallel to the longitudinal adjustment direction 16. The adjustment between the intermediate position and the closed position takes place parallel to a transverse adjustment direction 30, which lies at an angle, preferably at right angles, to the longitudinal adjustment direction 16.

The transverse adjustment direction 30 preferably lies parallel to the axis 3 of the valve opening 2.

A longitudinal stroke drive 25 is used for displacing the longitudinal stroke slides 14 along the longitudinal stroke guide parts 15. In the exemplary embodiment, this longitudinal stroke drive is formed by a pneumatic piston-cylinder unit, the piston rod 26 of which lies parallel to the longitudinal adjustment direction 16 and is connected to the connecting part 12. The connection takes place here via a transmission piece 27. The piston rod 26 is secured to the transmission piece 27. The transmission piece is connected non-displaceably in relation to the connecting part 12 with respect to the longitudinal adjustment direction 16, but is displaceable with respect to the transverse adjustment direction 30. For this purpose, connecting bolts 28 are provided which are held in the region of their two ends on the connecting part 12 and traverse a recess of the connecting part 12. The connecting bolts 28 pass through passage openings 29 of the transmission piece 27, and therefore the transmission piece 27 is guided displaceably in relation to the connecting bolts 28.

The cylinder of the piston-cylinder unit of the longitudinal stroke drive 25 is integrated in a drive block 35, wherein the cylinder space is formed by a recess of the drive block 35. However, at least one separate piston-cylinder unit could also be provided.

In the exemplary embodiment, the valve rod 9 passes through the transmission piece 27 with play (and therefore the adjustment of the closure member 4 between the intermediate position and the closed position and the associated movement of the valve rod 9 are made possible). For example, the longitudinal stroke drive could also comprise two piston-cylinder units which are arranged on both sides of the valve rod 9.

A connection between the longitudinal stroke drive 25 and the longitudinal stroke slide 14, which connection is non-displaceable in the longitudinal adjustment direction 16 but is displaceable in the transverse adjustment direction 30 could also be realized in another form.

Furthermore, a connection between the longitudinal stroke drive 25 and the longitudinal stroke slide 14, which connection is non-displaceable both in the direction of the longitudinal adjustment direction 16 and in the direction of the transverse adjustment direction 30 could also be provided. During the displacement of the closure member 4 and the valve rod 9 in the transverse adjustment direction 30, the longitudinal stroke drive 25 (together with corresponding holding parts) would then be displaced together therewith.

A transverse stroke drive 31 is used for displacing the transverse stroke slides 18 along the transverse stroke guide parts 19. In the exemplary embodiment, the transverse stroke drive is formed by pneumatic piston-cylinder units. The piston rods 32 of said piston-cylinder units lie parallel to the oblique adjustment direction 20 and are connected to the transverse stroke slide 18. For this purpose, in the exemplary embodiment, the piston rods 32 are each fastened to a connecting plate 33 which is fastened to the holding piece 34 of the respective longitudinal stroke guide part 15. Other connections of the piston rods 32 to the transverse stroke slides 18 are also conceivable and possible. The connection is immovable at least with respect to the oblique adjustment direction 20.

In the exemplary embodiment, the cylinders of the piston-cylinder units of the transverse stroke drive 31 are integrated in the drive block 35, wherein the respective cylinder space is formed by a recess of the drive block 35. However, separate piston-cylinder units could also be provided.

The longitudinal stroke drive 25 could also have more than one piston-cylinder unit. The transverse stroke drive could also have only one piston-cylinder unit or else more than two piston-cylinder units.

The longitudinal stroke drive 25 and the transverse stroke drive 31 are part of a drive unit 36 which is connected to the guide unit 23. In the exemplary embodiment, the drive block 35 is secured to the struts 21. Other connections between the drive unit 36 and the guide unit 23 are conceivable and possible.

In order to close the vacuum valve from its open state, first of all the respective longitudinal stroke slide 14 is displaced along the longitudinal stroke guide part 15 by the longitudinal stroke drive 25, as a result of which a linear displacement (=parallel displacement) of the closure member 4 parallel to the longitudinal adjustment direction 16 takes place from its open position into its intermediate position. In the open position (cf. FIGS. 2, 5-10, 17 and 18) of the closure member 4, the respective longitudinal stroke slide 14 has a first position relative to the respective longitudinal stroke guide part 15. In the intermediate position (cf. FIGS. 3, 11-13, 19 and 20) of the closure member 4, the respective longitudinal stroke slide 14 has a second position relative to the respective longitudinal stroke guide part 15. The first and second positions of the longitudinal stroke slide 14 can be secured, for example, by the end of the longitudinal stroke drive 25 and/or by stops and/or by a travel control.

As a result, the transverse stroke slides 18 are displaced by the transverse stroke drive 31 along the transverse stroke guide parts 19 from a first position, which the respective transverse stroke slide 18 takes up relative to the respectively assigned transverse stroke guide part 19, into a second position which the respective transverse stroke slide 18 takes up relative to the respectively assigned transverse stroke guide part 19. The first and second positions of the transverse stroke slide 18 can be secured, for example, by the end of the stroke of the transverse stroke drive 31 and/or by stops and/or by a travel control or a force control (such a force control can set the desired contact pressure force of the closure member 4 against the valve seat). During the displacement of the transverse stroke slides 18, the longitudinal stroke guide parts 15, to which the transverse stroke slides 18 are attached, are displaced at the same time. The relative position of the longitudinal stroke slides 14 to the longitudinal stroke guide parts 15 changes as a result, specifically a displacement of the respective longitudinal stroke slide relative to the longitudinal stroke guide part takes place in the direction of the first position of the longitudinal stroke slide 14, which position is taken up by the longitudinal stroke slide 14 relative to the respectively assigned longitudinal stroke guide part 15 in the open position of the closure member 4. The position of the longitudinal stroke slides 14 relative to the longitudinal adjustment direction 16 does not change here, but a parallel displacement of the longitudinal stroke slides 14 parallel to the transverse adjustment direction and an associated parallel displacement of the valve rod 9 and of the closure member 4 parallel to the transverse adjustment direction 30 take place. As a result, the adjustment of the closure member 4 parallel to the transverse adjustment direction from the intermediate position into the closed position takes place. The closed position of the closure member 4 is illustrated in FIGS. 4, 14-16, 21 and 22.

The adjustment of the closure member 4 from the closed position into the open position takes place in the reverse manner to that described previously.

The valve rod 9 extends with respect to the longitudinal adjustment direction 16 beyond the region in which the longitudinal stroke slides 14 are located in a direction directed away from the closure member 4. In this portion of its longitudinal extent, preferably in the region of its end remote from the closure member 4, the valve rod 9 is supported on a stop 47, which is held fixed on the valve body, in the closed position of the closure member 4. The stop 47 lies with respect to the transverse adjustment direction 30 on the same side of the valve rod 9 as the valve seat 5. By use of this support of the valve rod 9, the torques acting on the linear guides 13, 17 in the closed position of the closure member 4 are reduced and preferably at least substantially neutralized (if the connecting part 12 is located in the center of the valve rod 9, as is preferred). The stop 47 is advantageously of elastic design, preferably with an elasticity similar to the sealing ring 6.

The angle 37 which the oblique adjustment direction 20 encloses with the longitudinal adjustment direction 16 is advantageously less than 45° and greater than 4°, wherein an angle 37 within the range of 5° to 20° is preferred. For example, the angle 37 can be approximately 7.5°.

The transverse adjustment direction 30 lies in the plane spanned by the longitudinal adjustment direction 16 and transverse adjustment direction 30. In other words, the oblique adjustment direction is rotated by the angle 37 in relation to the longitudinal adjustment direction 16 about an axis lying at right angles to the longitudinal adjustment direction 16 and at right angles to the transverse adjustment direction 30.

In order to secure the closure member in the closed position even in the event of failure of the operating means of the longitudinal stroke and transverse stroke drive 25, 31, i.e. compressed air in the exemplary embodiment, use is made of a locking device. The latter comprises a first locking member 38 which, during normal operation, i.e. when the operating means for the longitudinal stroke and transverse stroke drive 25, 31 is present, is spaced apart from a second locking member 41 counter to the force of springs 40 by an actuator 39. The first locking member 38 is held displaceably on a part fixed on the valve body, in the exemplary embodiment on one of the struts 21, counter to the force of the at least one spring 40, and the second locking member is held non-displaceably in relation to the transverse stroke slide 18; in the exemplary embodiment, said second locking member is attached to the holding piece 34 lying opposite the strut 21.

In the exemplary embodiment, the actuator 39 is formed by a piston-cylinder unit, the cylinder of which is integrated in the strut 21 and the piston 42 of which is connected to the first locking member 38 via a piston rod.

If the operating means fails, the first locking member 38 is pressed by the springs 40 against the second locking member 41, wherein the interacting surfaces can be friction surfaces or else can have toothings. If the first locking member 38 is pressed against the second locking member 41, the positions of the transverse stroke slides 18 relative to the transverse stroke guide parts 19 are thereby fixed. As a result, the closure member 4 remains pressed against the valve seat 5 even if the operating means fails.

Modified embodiments of locking devices are also conceivable and possible. It is thus possible for there to be only one spring 40 or for there to be more than two springs 40. Instead of constructions with compression springs, constructions with tension springs, for example, would be conceivable.

A locking device designed in an analogous manner for fixing the closure member 4 in the open position if the operating means for the longitudinal stroke drive 25 and transverse stroke drive 31 fails could additionally or alternatively be provided. Locking members of said locking device could be arranged firstly on a part fixed on the valve body and secondly on a part moving together with the longitudinal stroke slide 14.

In order to ensure a synchronous movement of the transverse stroke slides 18 along the transverse stroke guide parts 19, the latter are advantageously connected to one another via a connecting piece 43. In the exemplary embodiment, this is a metal plate which is screwed to the two holding pieces 34.

Figure 4:
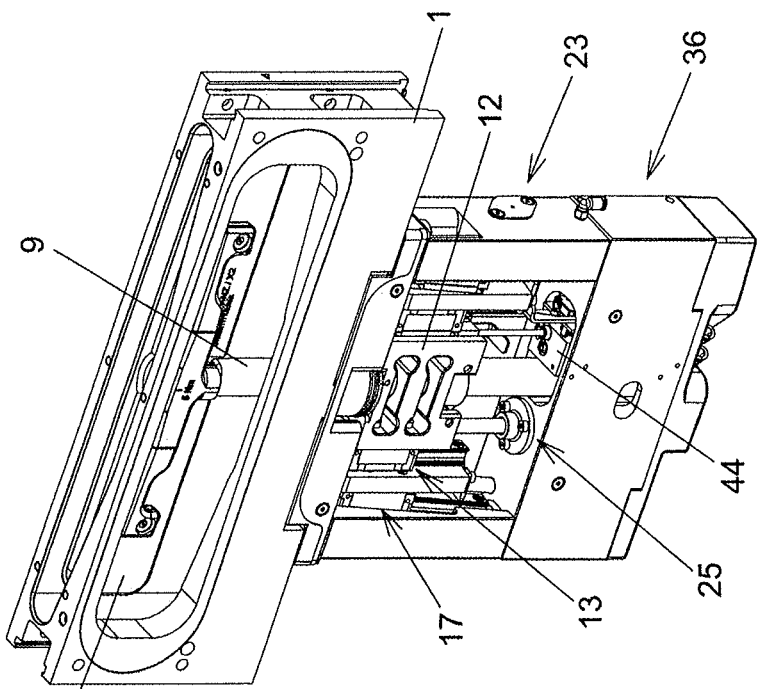
FIG. 4 shows a perspective view corresponding to FIG. 2, in the closed position of the closure member.
Figure 3:
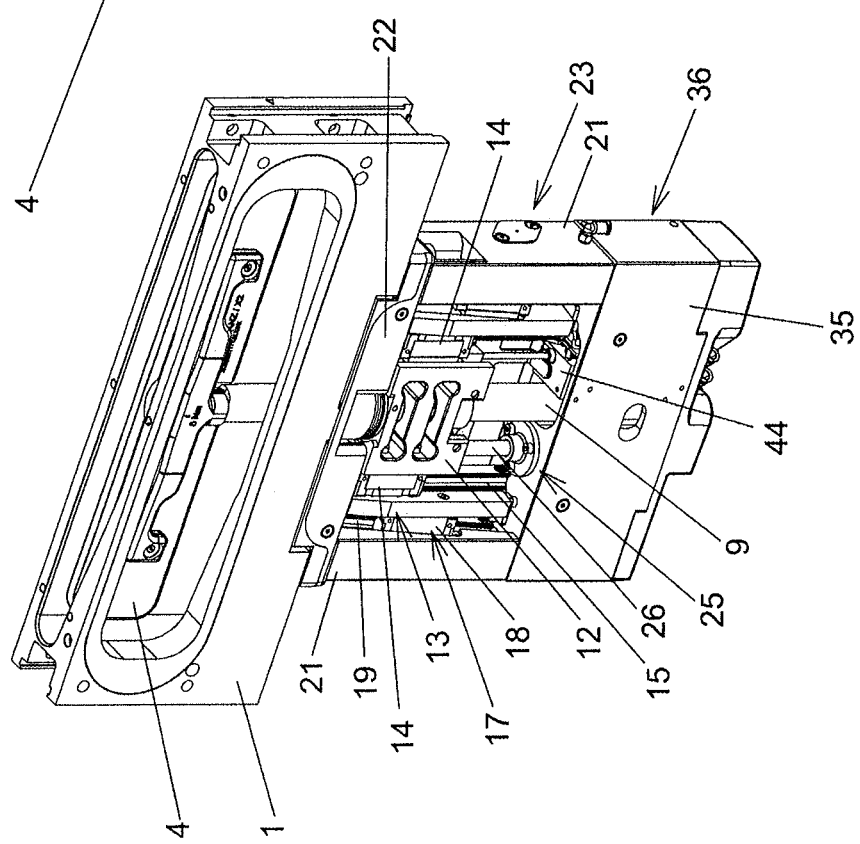
FIG. 3 shows a perspective view corresponding to FIG. 2 in the intermediate position of the closure member.
Figure 23:
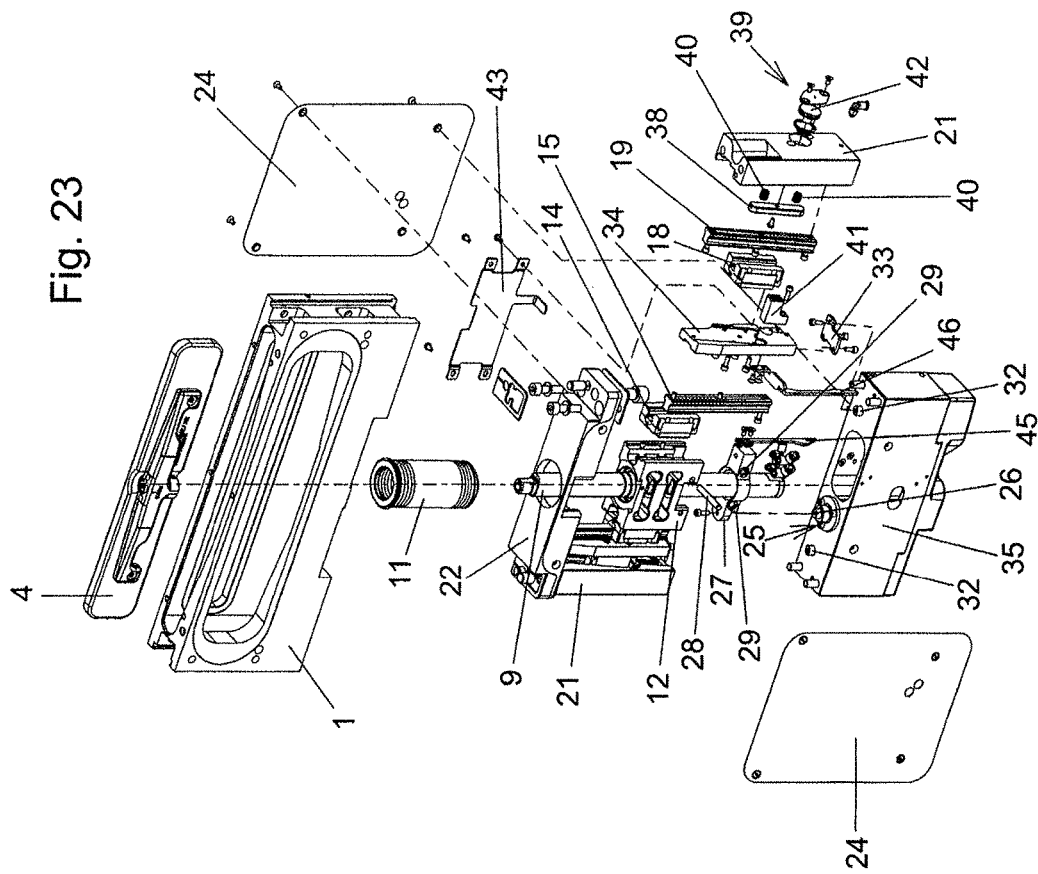
FIG. 23 shows an exploded illustration.
Figure 21:
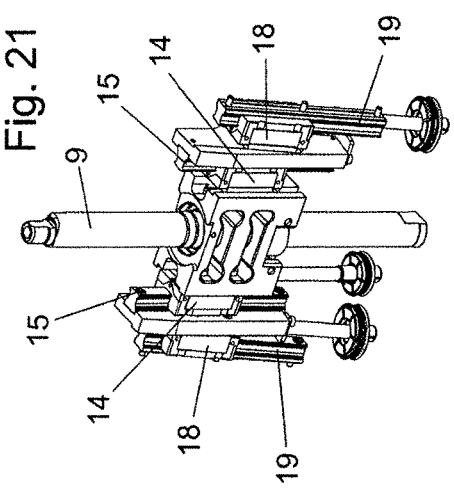
FIGS. 21 and 22 show perspective views analogously to FIGS. 17 and 18, but in the position in which the closed position of the closure member is present.
Figure 22:
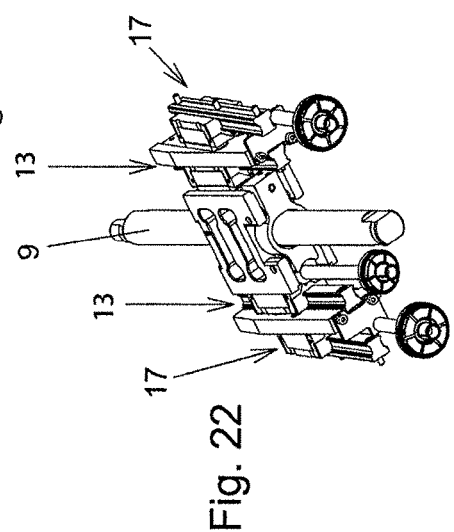

In order to achieve the correct sequence of the actuations by the longitudinal stroke drive 25 and transverse stroke drive 31, use is made of a sequence control 44 (cf. in particular FIGS. 3 and 4; said sequence control is omitted in FIG. 23). Such sequence controls are known, for example from the prior art mentioned at the beginning according to U.S. Pat. No. 8,177,190 B2, and do not need to be explained further at this juncture.

In order to detect the respectively current position of the closure member 4, use is made of position indicators (not visible in the Figures) which are arranged in the drive unit 36 and with which triggering parts 45 (cf. in particular FIG. 23) interact.

Instead of pneumatic drives for the longitudinal stroke drive and/or transverse stroke drive, use can also be made of drives operated by other operating means, for example electrically operated drives, e.g. electric motors, linear drives, etc. Such electrically operated drives can be designed, for example, in the form of rack drives, spindle drives, etc.

A drive unit 36 which is equipped with the respective drives and is connected to the guide unit 23 can be provided. The guide unit 23 can be of identical design here for different types of drives. There is therefore a "separating plane" between the drive unit 36 and the guide unit 23. A modular construction is therefore provided. A suitable module of a drive unit 36 can be connected to the guide unit depending on the desired type of drive. A retrospective exchange of the drive unit 36 is also possible, wherein the drive unit 36 is removed as a whole from the guide unit 23 and is replaced by a desired other drive unit 36.

Servicing of the vacuum valve in the event of a defect in the drive unit or else a defect in the guide unit is thereby also substantially simplified.

Different modifications of the exemplary embodiment shown are conceivable and possible without departing from the scope of the invention. The closure member could be attached, for example, to two or more parallel valve rods. The use of only one longitudinal stroke linear guide and/or only one transverse stroke linear guide or the use of more than two longitudinal stroke linear guides and/or transverse stroke linear guides would also be conceivable and possible.

KEY TO THE REFERENCE NUMBERS

1 Valve body
2 Valve opening
3 Axis
4 Closure member
5 Valve seat
6 Sealing ring
7 Interior space
8 Opening
9 Valve rod
10 Longitudinal axis
11 Expansion bellows
12 Connecting part
13 Longitudinal stroke linear guide
14 Longitudinal stroke slide
15 Longitudinal stroke guide part
16 Longitudinal adjustment direction
17 Transverse stroke linear guide
18 Transverse stroke slide
19 Transverse stroke guide part
20 Oblique adjustment direction
21 Strut
22 Support part
23 Guide unit
24 Covering plate
25 Longitudinal stroke drive
26 Piston rod
27 Transmission piece
28 Connecting bolt
29 Passage opening
30 Transverse adjustment direction
31 Transverse stroke drive
32 Piston rod
33 Connecting plate
34 Holding piece
35 Drive block
36 Drive unit
37 Angle
38 First locking member
39 Actuator
40 Spring
41 Second locking member
42 Piston
43 Connecting piece
44 Sequence control
45 Triggering part
46 Triggering part
47 Stop
48 Cover part

The invention claimed is:

1. A vacuum valve, comprising
a valve body with a valve opening which has an axis and is surrounded by a valve seat,
a closure member which is adjustable parallel to a longitudinal adjustment direction between an open position, in which said closure member opens up the valve opening, and an intermediate position, in which said closure member covers the valve opening but is raised from the valve seat, and which is adjustable parallel to a transverse adjustment direction between the intermediate position and a closed position, in which said closure member lies against the valve seat,
a valve rod which supports the closure member,
a longitudinal stroke linear guide which has a longitudinal stroke slide, which is connected to the valve rod, and a longitudinal stroke guide part, by which the longitudinal stroke slide is guided in a linearly displaceable manner in the longitudinal adjustment direction,
a longitudinal stroke drive, by which the longitudinal stroke slide is displaceable in relation to the longitudinal stroke guide part in order to adjust the closure member between the open position and the intermediate position, and
a transverse stroke drive for adjusting the closure member between the intermediate position and the closed position, a transverse stroke linear guide which comprises a transverse stroke slide, which is connected to the longitudinal stroke guide part, and a transverse stroke guide part, by which the transverse stroke slide is guided in a linearly displaceable manner in an oblique adjustment direction which lies obliquely with respect to the longitudinal adjustment direction,
wherein, in order to adjust the closure member between the intermediate position and the closed position, the transverse stroke slide is displaceable in relation to the transverse stroke guide part by the transverse stroke drive and, in the process, a displacement of the longitudinal stroke guide part in relation to the longitudinal stroke slide also takes place.

2. The vacuum valve as claimed in claim 1, wherein the oblique adjustment direction is inclined by an angle of less than 45° in relation to the longitudinal adjustment direction.

3. The vacuum valve as claimed in claim 2, wherein the angle is more than 4° in relation to the longitudinal adjustment direction.

4. The vacuum valve as claimed in claim 3, wherein the angle lies within the range of 5° to 20° with respect to the longitudinal adjustment direction.

5. The vacuum valve as claimed in claim 1, wherein the oblique adjustment direction lies in a plane spanned by the longitudinal adjustment direction and the transverse adjustment direction.

6. The vacuum valve as claimed in claim 1, wherein the transverse adjustment direction lies at right angles to the longitudinal adjustment direction.

7. The vacuum valve as claimed in claim 1, wherein the transverse adjustment direction lies parallel to the axis of the valve opening.

8. The vacuum valve as claimed in claim 1, wherein the valve rod has a longitudinal axis lying parallel to the longitudinal adjustment direction.

9. The vacuum valve as claimed in claim 1, wherein a connection of the longitudinal stroke slide to the longitudinal stroke drive provides movability parallel to the transverse adjustment direction.

10. The vacuum valve as claimed in claim 1, wherein the longitudinal stroke slide is rigidly connected to the valve rod.

11. The vacuum valve as claimed in claim 1, wherein the transverse stroke slide is rigidly connected to the longitudinal stroke guide part.

12. The vacuum valve as claimed in claim 1, further comprising an additional longitudinal stroke slide with an additional longitudinal stroke guide part, and an additional transverse stroke slide that is guided displaceably parallel to the oblique adjustment direction by an additional transverse stroke guide part, the respective longitudinal stroke slide which is guided displaceably parallel to the longitudinal adjustment direction by the respective longitudinal stroke guide part are attached on both sides of a connecting part which is connected to the valve rod, and the two longitudinal stroke guide parts are each connected to the respective transverse stroke slide which are guided displaceably parallel to the oblique adjustment direction by the respective transverse stroke guide part.

13. The vacuum valve as claimed in claim 1, further comprising a drive unit which has the longitudinal stroke drive and the transverse stroke drive connected to a guide unit, which comprises the longitudinal stroke linear guide and the transverse stroke linear guide, and is removable as a whole from said guide unit.

14. The vacuum valve as claimed in claim 1, further comprising a locking device that secures a position of the closure member in the event of failure of an operating medium of the longitudinal stroke drive and transverse stroke drive, the locking device including an actuator, and, in a normal operation by the actuator which is operated by the operating medium, a first locking member is spaced apart from a second locking member counter to a force of a spring and, if the operating medium fails, the first locking member is pressed by the spring against the second locking member and thereby blocks an adjustment of the closure member.

15. The vacuum valve as claimed in claim 14, wherein, in the event of failure of the operating medium, the closure member which is in said closed position is held in the closed position by the locking device, the first locking member is held on a part mounted on the valve body so as to be displaceable via the force of the spring and, during displacement of the transverse stroke slide along the transverse stroke guide part, the second locking member moves together with the transverse stroke slide.

* * * * *